United States Patent
Woodard

(10) Patent No.: US 7,040,328 B2
(45) Date of Patent: May 9, 2006

(54) FLUID/AIR BURST WASHING SYSTEM

(75) Inventor: Kenneth S. Woodard, New Boston, NH (US)

(73) Assignee: Kollsman, Inc., Merrimack, NH (US)

( * ) Notice: Subject to any disclaimer, the term of this patent is extended or adjusted under 35 U.S.C. 154(b) by 413 days.

(21) Appl. No.: 10/284,833

(22) Filed: Oct. 31, 2002

(65) Prior Publication Data
US 2004/0084069 A1    May 6, 2004

(51) Int. Cl.
  *B08B 3/02*  (2006.01)
  *B05B 1/10*  (2006.01)
  *A47L 1/00*  (2006.01)
(52) U.S. Cl. .................. 134/95.2; 134/102.3; 134/180; 15/302; 15/313; 239/284.1; 239/284.2
(58) Field of Classification Search ............... 134/95.1, 134/95.2, 99.1, 102.3, 172, 174, 178, 180, 134/198; 15/302, 313, 316.1; 239/284.1, 239/284.2
See application file for complete search history.

(56) References Cited

U.S. PATENT DOCUMENTS

| | | | |
|---|---|---|---|
| 1,854,758 A | 4/1932 | Noble | |
| 1,932,798 A | 10/1933 | Millard | |
| 2,032,998 A | 3/1936 | Mickadeit | |
| 2,926,396 A | 3/1960 | Hess | |
| 3,769,898 A | 11/1973 | Ide | |
| 3,915,385 A * | 10/1975 | Hassinger | 239/284.2 |
| 4,248,383 A * | 2/1981 | Savage et al. | 239/284.2 |
| 4,324,363 A * | 4/1982 | Rauen, Jr. | 239/284.2 |
| 5,083,339 A * | 1/1992 | Bristow | 15/250.002 |
| 5,383,247 A * | 1/1995 | Nickel | 15/250.04 |
| 5,419,005 A * | 5/1995 | Mori | 15/313 |
| 6,077,361 A * | 6/2000 | Glenn | 134/21 |
| 6,554,210 B1 * | 4/2003 | Holt et al. | 239/284.2 |

* cited by examiner

Primary Examiner—Joseph L. Perrin
(74) Attorney, Agent, or Firm—William B. Ritchie

(57) ABSTRACT

A combination fluid and air washing apparatus for washing a vehicle's viewing surface. The apparatus includes a housing, a nozzle assembly with at least one fluid nozzle and at least one air nozzle corresponding to each of fluid nozzles. A shaft is pivotally attached to the housing. The fluid and air nozzles are adjacently attached to the shaft and point towards the vehicle viewing surface. The air nozzle points lower on the vehicle viewing surface than the fluid nozzle. A pressured lines provides pressured air to the washing apparatus. The air compressor provides pressured air to the fluid reservoir forcing the fluid through the fluid nozzle and the air compressor simultaneously provides pressured air through the line to the air nozzle. Thus, the vehicle's viewing surface with the fluid and the fluid washes the vehicle's viewing surface and the air dries the vehicle's viewing surface.

5 Claims, 2 Drawing Sheets

FLUID/AIR BURST WASHING SYSTEM

FIELD OF THE INVENTION

The present invention relates to the field of washing systems and, in particular, to an apparatus for fluid and air burst washing for vehicle viewing surfaces.

BACKGROUND OF THE INVENTION

Vehicle sight windows and other surfaces often become dirty and in cold conditions also become coated with ice and/or snow. Vehicles having windshields and other sight windows (referred to as viewing surfaces) typically employ oscillating elastomeric blade windshield wipers to remove rain and snow from the exterior viewing surfaces of the vehicle. Such blades can be annoying as they move back and forth across the viewing surface, and often the motion is not rapid enough to satisfactorily remove rain and snow. Snow and ice can accumulate on the blades, requiring the driver of a vehicle to periodically manually clean the blades, which can create a safety hazard. The ice may also freeze the blades to the viewing surface when the vehicle is parked. Such blades also tend to smear the windshield, or other viewing surfaces, welding road tars and smudges against the viewing surface. Additionally, they can cause immediate damage to an optical surface if there are any hard particles (e.g. sand) on the viewing surface to be dragged across the surface by the wiper. Wipers also slowly degrade the viewing surface over time through surface erosion due to repeated sliding contact between the wiper blade squeegee and the viewing surface.

Because blade squeegees are made from relatively soft materials (typically rubber or synthetic rubber) they are subject to wear, and become hard, dry and brittle due to aging, therefore requiring routine replacement. Additionally, vision through the viewing surface is degraded during the washing cycle for a relatively long time and wiper reliability is dependant upon motors (usually electric), linkages, and bushings/bearings. Very perceptible and annoying sounds may also emerge from the actuating mechanism as it reverses at the end of each stroke, creating squeaks as the blades cub against the glass.

A number of attempts have been made to avoid the use of such conventional elastomeric blades. U.S. Pat. No. 1,854,758, issued Apr. 19, 1932, to Noble, describes a windshield cleaner which directs hot air from the engine compartment against the exterior surface of a windshield. The hot air is gathered against a collecting deflector in the engine compartment that receives rearwardly flowing air as a result of the vehicle's forward motion. The air escapes through openings formed at the rear edges of the hood wings by the mounting of the device therein and external baffles direct the air against the windshield.

U.S. Pat. No. 1,932,798, issued Oct. 31, 1933, to Millard, describes various embodiments of arrangements for directing hot air at the exterior surface of a windshield, including the use of a blower and the injection of glycerin into the air stream.

U.S. Pat. No. 2,032,998, issued Mar. 3, 1936, to Mickadeit, describes an air-heated windshield in which air flows by convection into a coil wrapped around the exhaust manifold of a vehicle, then flows through control devices, and finally flows through perforated manifolds surrounding the windshield and across the windshield.

U.S. Pat. No. 2,926,396, issued Mar. 1, 1960, to Hess, describes a system for blowing heated air against a windshield in which heated air from a blower in the engine compartment is mixed with an air stream created by the forward motion of the vehicle.

U.S. Pat. No. 3,769,898, issued Nov. 6, 1973, to Ide, describes a system for blowing hot air across a windshield which includes blowers disposed in ducts behind the vehicle's radiator. The air is ducted to the lower edge of the windshield where it discharges against the windshield through slits.

These attempts to eliminate the need for wipers using high velocity airflow over a windshield have many drawbacks. Various disadvantages of the above devices are poor air flow, poor air distribution, and complexity. Additionally, all of these devices have upwardly open air outlets which gather fallen dirt, leaves and other debris.

These devices and methods are more effective for continuous rain removal rather than cleaning. However, if a fluid spray were added to adapt this method for cleaning, the system would have many disadvantages. First, the system would need continuous, high capacity air supply. Second, the system would need a separate control system for the fluid supply. Lastly, the effectiveness of the system would be limited because a continuous airflow is not very effective at dislodging dirt.

Therefore, there is a need for a surface washing system that does not include the use of wiper blades that does not require continuous, high capacity air supply washing, that does not need a separate control system for the fluid supply, and that is very effective at dislodging dirt from the surface.

SUMMARY OF THE INVENTION

In accordance with one aspect of the present invention, a combination fluid and air washing apparatus is provided for washing a vehicle's viewing surface. The apparatus includes a housing, where the housing is of a predetermined shape and size, a nozzle assembly, the nozzle assembly includes at least one fluid nozzle, an air nozzle to complement each of the fluid nozzles, and a shaft, the shaft being pivotally attached to the housing by a pivot means, the fluid and air nozzles are adjacently attached to the shaft and pointed towards the vehicle viewing surface, wherein the air nozzle is pointed lower on the vehicle viewing surface than the fluid nozzle. The apparatus also includes at least one fluid reservoir attached to the housing, wherein the fluid reservoir provides fluid to the fluid nozzle through a fluid feed, and an air compressor connected to the fluid reservoir and the air nozzle by a line, wherein said air compressor provides pressured air to the washing apparatus through the line. The apparatus, in practice, works as follows: the air compressor provides pressured air to the fluid reservoir forcing the fluid through the fluid feed to the fluid nozzle and wherein the air compressor simultaneously provides pressured air through the line to the air nozzle and whereby, simultaneously, the air nozzle sprays the vehicle's viewing surface with the pressurized air and the fluid nozzle sprays the vehicle's viewing surface with the fluid and the fluid washes the vehicle's viewing surface and the air dries the vehicle's viewing surface.

Implementation of this aspect of the present invention may include one or more of the following. Pressurized air is provided to the washing apparatus when a valve is in an open position, the valve is connected to a remote manual control device wherein the manual control device opens and closes the valve. A pressurized air reservoir connected to the air compressor. The pivot means are flex pivots, or where the pivot means are bushings with return springs.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

Figure 1:
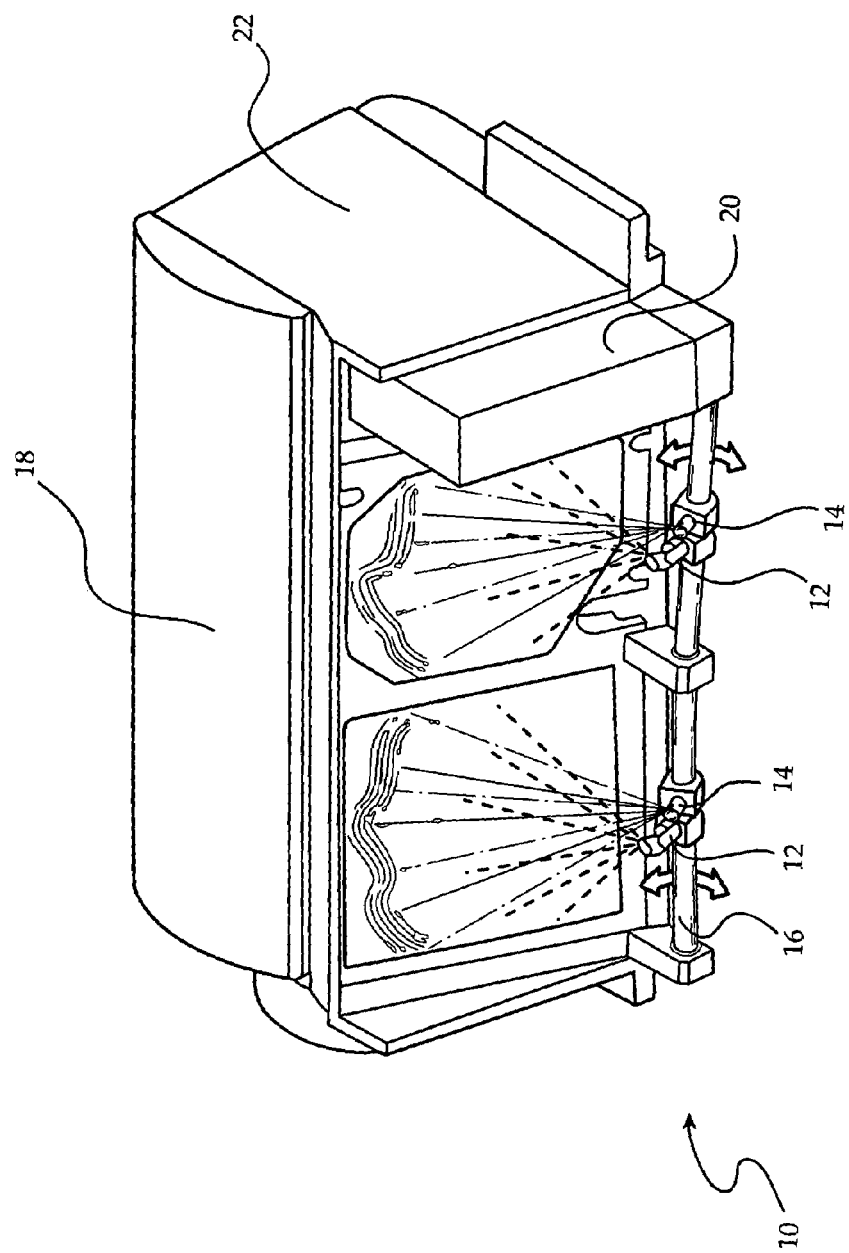
FIG. 1 is a front view of the preferred embodiment of the housing, fluid reservoir and nozzle assembly of the present invention.

The present invention is a washing system having a fluid and an air component. Referring first to FIG. 1, the front view of the preferred embodiment of the housing, fluid reservoir and nozzle assembly of the present invention is shown. The washing system 10 can be adapted into the design of car, airplane, truck or other transportation vehicle. The apparatus can be used to wash windshields, side windows, rear windows or any other viewing surface of the transportation vehicle. The washing system includes two sets of two nozzles 12, 14, the fluid nozzle 12 and the air nozzle 14. Both sets of nozzles 12, 14 are mounted onto a single shaft 16. Thus, the nozzles 12, 14 and the shaft 16 form the nozzle assembly. The nozzles 12, 14 are high impact nozzles. Although in the preferred embodiment, the nozzle assembly includes two sets of two nozzles, in other embodiments, the nozzle assembly includes any number of additional sets of nozzles.

The air nozzle 14 is clocked a small angle behind the fluid nozzle 12 relative to the direction of actuation of the nozzle assembly. In the preferred embodiment, the nozzle assembly is spring loaded to a start of actuation position via flex pivots (not shown). In other embodiments, conventional bushings with return springs could be used.

In the preferred embodiment, the shaft 16 is hollow to allow the passage of washer fluid and air into their respective nozzles 12, 14. In other embodiments, the fluid nozzle 12 and the air nozzle 14 are connected to fluid and air lines that are brought to the respective nozzles 12, 14 externally.

The fluid is provided to the fluid nozzles 12 from the main fluid reservoir 18. Additional fluid is kept in a back-up fluid reservoir 20. Although in the preferred embodiment, the invention includes two fluid reservoirs 16, 18, in other embodiments, the present invention could include additional back-up fluid reservoirs.

Figure 2:
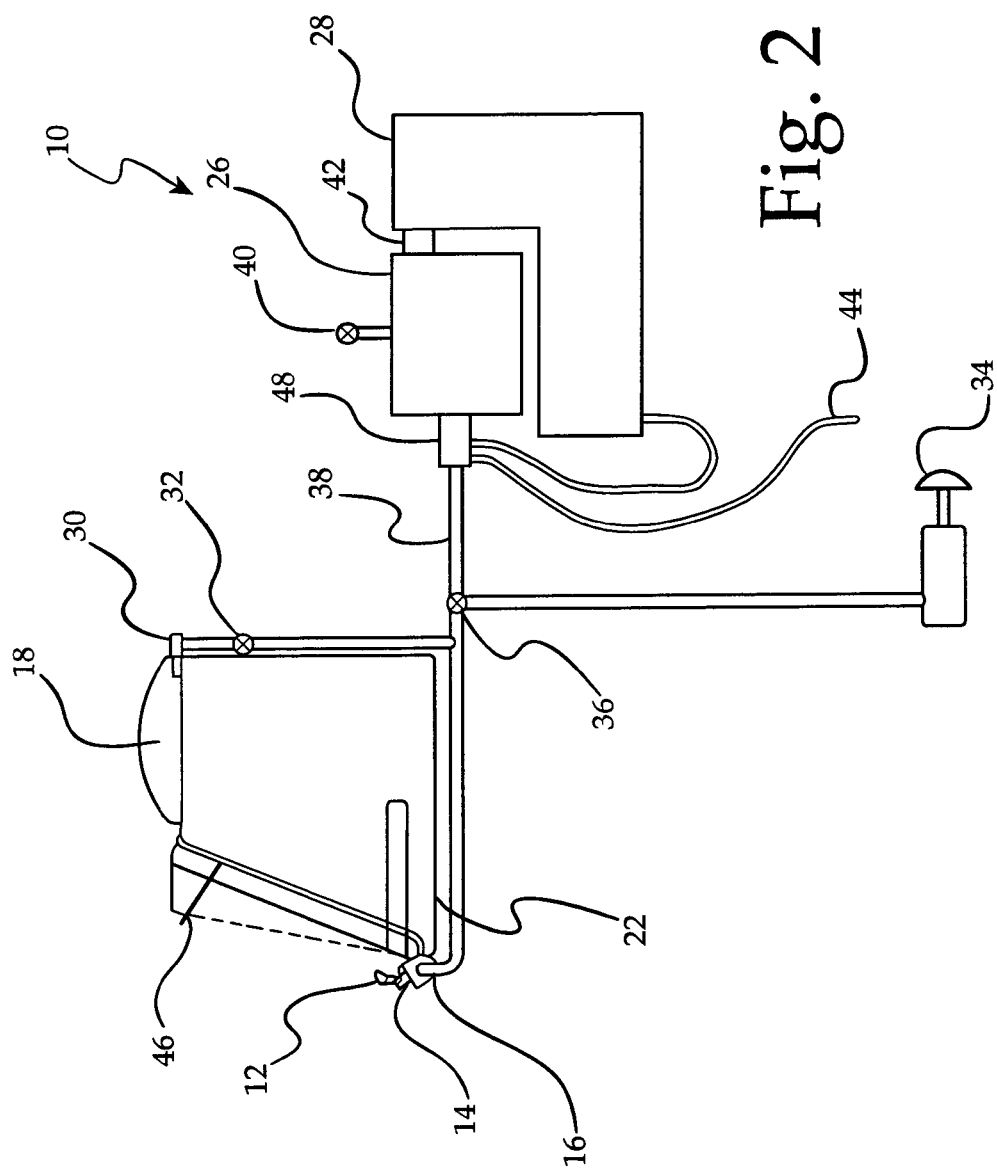
FIG. 2 is a schematic view of the preferred embodiment of the washing system of the present invention.

Referring next to FIG. 2, a schematic view of the preferred embodiment of the washing system is shown. The washing system 10, including the elements shown in FIG. 2, is integrated into a vehicle. The washer fluid reservoir 18 is shown on top, which provides the fluid for washing the vehicle's viewing surface. An air compressor 28 supplies the high-pressured air used for drying the viewing surface. The pressurized air reservoir 26 is connected to the air compressor 28 by an exhaust 42. The air reservoir 26 enables the washing system 10 to allow a finite number of multiple pressure bursts without having to continuously operate the compressor 28. The main air line 38 supplies pressure from the air compressor 28 to both the fluid reservoir 18 and the air nozzle 12 via a single control valve 36.

In practice, the washing system 10 works as follows. At the start of operation, the nozzle assembly is held in its start position by the unstrained position of the flex pivots (not shown). In this position, the fluid nozzle 14 should be aimed at the bottom of the viewing surface and the air nozzle 12 slightly below the viewing surface. Thus, the fluid nozzle 14 is aimed slightly higher than the air nozzle 12. When viewing surface washing is desired, an operator activates the washing system 10 using the manual control 34. In the preferred embodiment, this control can be any type of manual control found in vehicles, and any type of manual control known to those of ordinary skill in the art, including, but not limited to, a switch, a button or a dial. The manual switch 34 opens the on-off valve 36 which then opens the air pressure supply located in the air reservoir 26. The pressurized air then travels through the main air line 38 to the fluid reservoir through a high pressure air inlet 30 and to the air nozzle 12 through the hollow shaft 16. The main air line 38 is therefore connected to both the fluid reservoir 18 and to the air nozzle 12. The high-pressured air forces fluid from the air reservoir to advance through the cleaning fluid feed 46, connecting the fluid reservoir 18 to the fluid nozzle 14. Therefore, both the fluid nozzle 14 and the air nozzle 12 are simultaneously pressurized. The two nozzles 12, 14 then spray the viewing surface simultaneously, but the air spray impact line with the viewing surface is below the fluid line due to the slight difference in angular position of the nozzles 12, 14 about the shaft 16. The reaction of the air and fluid effluents against the nozzles 12, 14 create a moment about the shaft 16, thus causing the nozzle assembly to rotate about the flex pivots (not shown). As the nozzle assembly rotates, the fluid and air streams traverse the entire viewing surface. At all times, the air stream is behind the fluid stream drying the wetter surface almost immediately. At the end of the traverse, the pressurized burst is shut off and the nozzle assembly again returns to the start position via the flex pivots (not shown).

The washing system 10 is powered by electrical current, which is carried to the washing system 10 via electric wiring 44. The electric wiring 44 enters the washing system 10 via the pressure sensor/solenoid switch 48. In the preferred embodiment, the air compressor 28 is a lightweight air compressor with a built in check valve. The air reservoir 26 is equipped with an emergency pressure relief valve 40, and the high-pressure air line 38 is equipped with a back check valve 32.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A combination fluid and air washing apparatus for washing a vehicle's viewing surface, said apparatus comprising:
   a housing, said housing being of a predetermined shape and size;
   a nozzle assembly, said nozzle assembly comprising at least one fluid nozzle, an air nozzle to complement each of said fluid nozzles, and a shaft, said fluid nozzle being linearly fixed into position relative to said shaft and the fluid nozzle is relatively fixed over the vehicle's viewing surface with the viewing surface receiving full coverage by rotation of said fluid nozzle, said shaft being pivotally attached to said housing by pivots, said fluid and air nozzles being adjacently attached to said shaft and pointed towards said vehicle viewing surface, wherein said air nozzle is pointed lower on said vehicle viewing surface than said fluid nozzle;

at least one fluid reservoir attached to said housing, wherein said fluid reservoir provides fluid to said fluid nozzle through a fluid feed; and an air compressor connected to said fluid reservoir and said air nozzle by a line, wherein said air compressor provides pressured air to said washing apparatus through said line, said air nozzle receiving full coverage of the vehicle's viewing surface by rotation on said shaft;

wherein said air compressor provides pressured air to said fluid reservoir forcing said fluid through said fluid feed to said fluid nozzle and wherein said air compressor simultaneously provides pressured air through said line to said air nozzle and whereby, simultaneously, said air nozzle sprays said vehicle's viewing surface with said pressurized air and said fluid nozzle sprays said vehicle's viewing surface with said fluid and said fluid washes said vehicle's viewing surface and said air dries said vehicle's viewing surface.

2. The washing apparatus claimed in claim 1 wherein said pressurized air is provided to said washing apparatus when a valve is in an open position, said valve is connected to a remote manual control device wherein said manual control device opens and closes said valve.

3. The washing apparatus claimed in claim 1 wherein said apparatus having a pressurized air reservoir connected to said air compressor.

4. The washing apparatus claimed in claim 1 wherein said pivots are flex pivots.

5. The washing apparatus claimed in claim 1 wherein said pivots are bushings with return springs.

* * * * *